(No Model.)
G. B. ADAMS.
STUD OR BUTTON.
No. 539,400. Patented May 21, 1895.
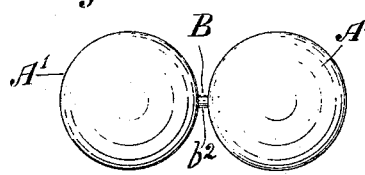
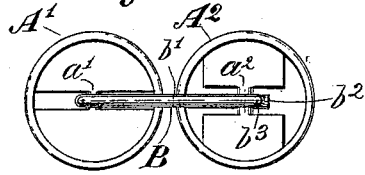
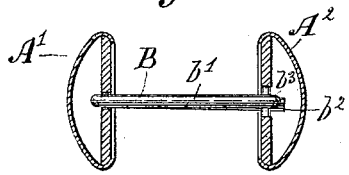
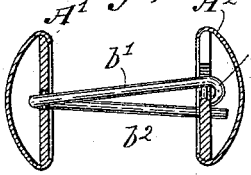
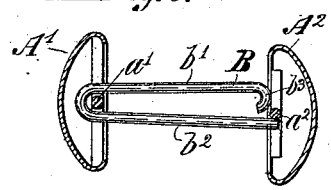
WITNESSES:
Wm A. Pollock
Jas. J. Cullen
INVENTOR
George B Adams
BY
Edwin H. Brown
HIS ATTORNEY

UNITED STATES PATENT OFFICE.

GEORGE B. ADAMS, OF IRVINGTON, NEW JERSEY.

STUD OR BUTTON.

SPECIFICATION forming part of Letters Patent No. 539,400, dated May 21, 1895.

Application filed June 29, 1894. Serial No. 516,082. (No model.)

*To all whom it may concern:*

Be it known that I, GEORGE B. ADAMS, of the town of Irvington, county of Essex, and State of New Jersey, have invented a certain new and useful Improvement in Studs or Buttons, of which the following is a specification.

My improvement relates to studs or buttons having detachable parts. It is especially applicable to what are known as link studs for cuffs. The object is to provide, in a simple manner, for detaching one part from another.

The improvement consists in the combination of two buttons or heads and a link or shank connected with one, and connected detachably with the other; said link or shank being so constructed that by a slight twisting motion it may be detached from the button or head with which it is detachably connected.

In the accompanying drawings, Figure 1 is a front view of a link stud or button embodying my improvement. Fig. 2 is a back view of the same. Fig. 3 is a section of the same, taken parallel with the length of the shank or link. Fig. 4 is a section similar to Fig. 3, but shows the shank or link twisted so as to detach it. Fig. 5 is a section similar to Fig. 3, illustrating the parts in different relation.

Similar letters of reference designate corresponding parts in all the figures.

$A'$ $A^2$ designate two buttons or heads. They may be of any ordinary or approved construction. In the present instance they are shown as having flat back plates, provided with bars $a'$ $a^2$, but instead of having straight bars as shown, they may have bent bars or may have ordinary projecting eyes.

B designates the link or shank of the button. In the example of my improvement illustrated in Figs. 1, 2, 3, 4, and 5, this shank or link is pivoted or connected to the button or head $A'$, and has two portions, $b'$, $b^2$, which may either or both be resilient, one being provided with a hook or bend $b^3$, and the other being extended past the end of this hook or bend. The pivoting of this link or shank to the button or head $A'$ is represented as being accomplished by making the whole link or shank of bent wire, and passing it around the bar $a'$ of said button or head.

The hook $b^3$ of the link or shank, is of suitable size to extend across the inner side of the bar $a^2$ of the button or head $A^2$. Thus a pivoted connection will be made between the link or shank and the button or head $A^2$. Normally the link or shank will be approximately at right angles to the bar $a^2$ of the button or head $A^2$, as represented in Figs. 1, 2 and 3; but if the link or shank is twisted axially with relation to the button or head $A^2$ one of its portions will find a bearing against one side of the bar $a^2$ of said button or head $A^2$, and the other of its portions will find a bearing against the other side of said bar. Continued force applied in twisting the link or shank will cause a spreading of the two parts of the link or shank laterally, so that the hook $b^3$ may be disengaged from the bar $a^2$ of the said button or head $A^2$. When the hook $b^3$ of the link or shank is thus disengaged from the bar $a^2$ of the button or head $A^2$, the link may be entirely detached by pulling it past the said bar.

In that example of my improvement which I have illustrated, that is, one embodying buttons having straight bars $a'$, $a^2$, when the shank B is twisted, the two portions thereof $b'$, $b^2$ impinge against opposite sides of the bars $a'$, or $a^2$ and are held in engagement until the opening becomes wide enough for the button to be slipped out. In fact the straight bars $a'$, $a^2$, constitute stops against which the portions of the shank abut during the twisting movement. If the bars $a'$, $a^2$ are curved, however, they must be formed with suitable stops to arrest the movement of the shank to permit of its disengagement.

The link may be re-engaged with the bar $a^2$ of the button or head $A^2$ by simply slipping it over the same, as indicated in Fig. 5.

Obviously, my improvement is susceptible of other modifications, without departing from the principle involved.

It is essential to the improvement that there should be a spring, link or shank in combination with a hook, in the sense of a shank having a part or parts made resilient and provided with a hook or a part bent to answer the same purpose as a hook.

What I claim as my invention, and desire to secure by Letters Patent, is—

1. In combination with a button or stud having a suitable eye, a link constructed from a continuous piece of metal bent upon itself forming parallel flexible arms, and having a loop at one end integral with said arms, one of said arms being bent at its free end to form a hook, the free end of the other arm lying upon and extending slightly beyond said hook, substantially as specified.

2. In combination with a button or stud having a flat back plate and a central bar, a link constructed from a continuous piece of metal bent upon itself forming parallel flexible arms, and having a loop at one end integral with said arms, one of said arms being bent at its free end to form a hook, the free end of the other arm lying upon and extending slightly beyond said hook, substantially as specified.

In testimony whereof I have signed my name to this specification in the presence of two subscribing witnesses.

GEORGE B. ADAMS.

Witnesses:
EDWIN H. BROWN,
R. LAWSON.